United States Patent [19]

Jain et al.

[11] Patent Number: 5,586,332
[45] Date of Patent: Dec. 17, 1996

[54] POWER MANAGEMENT FOR LOW POWER PROCESSORS THROUGH THE USE OF AUTO CLOCK-THROTTLING

[75] Inventors: Sanjay Jain, Santa Clara; Deepak J. Aatresh, Sunnyvale, both of Calif.

[73] Assignee: Intel Corporation, Santa Clara, Calif.

[21] Appl. No.: 36,343

[22] Filed: Mar. 24, 1993

[51] Int. Cl.⁶ ....................................................... G06F 1/32
[52] U.S. Cl. .................... 395/750; 364/707; 364/273.1; 364/273.2; 364/273.3; 364/262.4; 364/DIG. 1
[58] Field of Search ................................. 395/750, 775, 395/550, 375, 800; 364/707; 365/226, 227; 307/66; 377/16

[56] References Cited

U.S. PATENT DOCUMENTS

| | | | |
|---|---|---|---|
| 3,623,017 | 11/1971 | Lowell et al. | 340/172.5 |
| 3,715,729 | 2/1973 | Mercy | 340/172.5 |
| 3,736,569 | 5/1973 | Bouricius et al. | 395/750 |
| 3,895,311 | 7/1975 | Basse et al. | 331/1 A |
| 3,919,695 | 11/1975 | Gooding | 340/172.5 |
| 3,931,585 | 1/1976 | Barker et al. | 331/1 A |
| 3,936,762 | 2/1976 | Cox, Jr. et al. | 329/104 |
| 4,077,016 | 2/1978 | Sanders et al. | 331/4 |
| 4,095,267 | 6/1978 | Morimoto | 364/200 |
| 4,203,153 | 5/1980 | Boyd | 364/200 |
| 4,264,863 | 4/1981 | Kojima | 328/39 |
| 4,293,927 | 10/1981 | Hoshii | 364/900 |
| 4,300,019 | 11/1981 | Toyomaki | 179/1 GE |
| 4,365,290 | 12/1982 | Nelms et al. | 364/200 |
| 4,405,898 | 9/1983 | Flemming | 328/72 |
| 4,479,191 | 10/1984 | Nojima et al. | 364/707 |
| 4,545,030 | 10/1985 | Kitchin | 395/550 |
| 4,615,005 | 9/1986 | Maejima et al. | 364/200 |
| 4,638,452 | 1/1987 | Schultz et al. | 395/550 |
| 4,639,864 | 1/1987 | Katzman et al. | 364/200 |
| 4,667,289 | 5/1987 | Yoshida et al. | 364/200 |
| 4,669,099 | 5/1987 | Zinn | 377/47 |
| 4,698,748 | 10/1987 | Juzswik et al. | 364/200 |

(List continued on next page.)

FOREIGN PATENT DOCUMENTS

| | | |
|---|---|---|
| 83108170 | 8/1983 | European Pat. Off. . |
| 84630152 | 10/1984 | European Pat. Off. . |
| 87300232 | 1/1987 | European Pat. Off. . |
| 89109896 | 6/1989 | European Pat. Off. . |
| 89309300 | 9/1989 | European Pat. Off. . |
| 89120284 | 11/1989 | European Pat. Off. . |
| 90117215 | 9/1990 | European Pat. Off. . |
| 91105133 | 3/1991 | European Pat. Off. . |
| 91007415 | 8/1991 | European Pat. Off. . |
| 7845309 | 11/1978 | United Kingdom . |
| 8326610 | 10/1983 | United Kingdom . |

OTHER PUBLICATIONS

Slater, Michael. "MIPS previews 64–bit R4000 architecture", Microprocessor Report, vol.: v5, Issue: n2, p. 1(6), Feb. 6, 1991.

Case, Brian. "R4000 extends R3000 architecture with 64–bit capabilites", Microprocessor Report, vol.: v5, Issue: n19, p. 10(4), Oct. 16, 1991.

Wilson, Ron. "MIPS rethinks RISC with superpipelining", Computer Design, vol.: v30, Issue: n3, p. 28(3), Feb. 1, 1991.

Intel Automotive Components Handbook "Power–On Reset", 1988, pp. 10–24 & 10–25.

Motorola MC6802032—Bit Microprocessor User's Manual, 3rd Edition, 1990, pp. 1–3.

*Primary Examiner*—Gopal C. Ray
*Attorney, Agent, or Firm*—Blakely, Sokoloff, Taylor & Zafman

[57] ABSTRACT

A clock throttling mechanism turns off certain processor components to minimize power consumption. The processor detects the issuance of certain bus cycles or the execution of certain instructions which typically cause the processor to be idle for a period of time. Control circuitry detects the existence of the instruction and/or bus cycle and shuts down the clock driving certain processor components during that idle period. The control circuitry then detects the occurrence or upcoming occurrence of an event to which the processor responds and becomes active. At detection of this event, the clock signal input to these components is then restarted such that the processor can continue normal execution.

44 Claims, 5 Drawing Sheets

U.S. PATENT DOCUMENTS

| | | | |
|---|---|---|---|
| 4,758,945 | 7/1988 | Remedi | 364/200 |
| 4,763,294 | 8/1988 | Fong | 395/375 |
| 4,766,567 | 8/1988 | Kato | 364/900 |
| 4,780,843 | 10/1988 | Tietjen | 395/725 |
| 4,814,591 | 3/1989 | Nara et al. | 235/380 |
| 4,823,292 | 4/1989 | Hillion | 364/707 |
| 4,841,440 | 6/1989 | Yonezu et al. | 364/200 |
| 4,881,205 | 11/1989 | Aihara | 365/222 |
| 4,896,260 | 1/1990 | Hyatt | 364/200 |
| 4,907,183 | 3/1990 | Tanaka | 364/707 |
| 4,922,450 | 5/1990 | Rose et al. | 364/900 |
| 4,935,863 | 6/1990 | Calvas et al. | 364/138 |
| 4,979,097 | 12/1990 | Triolo et al. | 364/200 |
| 4,980,836 | 12/1990 | Carter et al. | 364/483 |
| 4,983,966 | 1/1991 | Grone et al. | 341/84 |
| 4,991,129 | 2/1991 | Swartz | 364/707 |
| 5,021,679 | 6/1991 | Fairbanks et al. | 307/66 |
| 5,059,924 | 10/1991 | JenningsCheck | 331/1 A |
| 5,077,686 | 12/1991 | Rubinstein | 395/550 |
| 5,083,266 | 1/1992 | Watanabe | 395/275 |
| 5,103,114 | 4/1992 | Fitch | 307/271 |
| 5,123,107 | 6/1992 | Mensch, Jr. | 395/800 |
| 5,129,091 | 7/1992 | Yorimoto et al. | 395/750 |
| 5,133,064 | 7/1992 | Hotta et al. | 395/550 |
| 5,151,992 | 9/1992 | Nagae | 395/750 |
| 5,167,024 | 11/1992 | Smith et al. | 395/375 |
| 5,175,845 | 12/1992 | Little | 395/550 |
| 5,189,647 | 2/1993 | Suzuki et al. | 368/10 |
| 5,220,672 | 6/1993 | Nakao et al. | 395/750 |
| 5,239,652 | 8/1993 | Seibert et al. | 395/750 |
| 5,249,298 | 9/1993 | Bolan et al. | 395/750 |
| 5,251,320 | 10/1993 | Kuzawinski et al. | 395/750 |
| 5,263,028 | 11/1993 | Borgnis et al. | 370/105.1 |
| 5,319,771 | 6/1994 | Takeda | 395/550 |
| 5,329,621 | 7/1994 | Burgess et al. | 395/287 |
| 5,336,939 | 8/1994 | Eitrheim et al. | 307/269 |
| 5,355,501 | 10/1994 | Gross et al. | 395/750 |
| 5,359,232 | 10/1994 | Eitrheim et al. | 307/268 |
| 5,396,635 | 3/1995 | Fung | 395/800 |
| 5,404,546 | 4/1995 | Stewart | 395/750 |
| 5,428,754 | 6/1995 | Baldwin | 395/375 |
| 5,461,652 | 10/1995 | Hongo | 368/10 |

8 MHz EXTERNAL BUS

| 8 MHz EXTERNAL BUS | % | Avg. CPU clks for 8 MHz ISA system | Weighted Mix | Clock Throttle power savings leverage |
|---|---|---|---|---|
| Mem. Write | 70.4 | 6 | 422.4 | NA |
| Prefetch | 14.6 | 5 | 73.0 | NA |
| Data Read | 9.6 | 5 | 48.0 | 6.03%/1.51 |
| I/O Read | 2.5 | 42 | 105 | 13.19% |
| I/O Write | 2.1 | 42 | 88.2 | 11.08% |
| Other | 0.8 | 74 | 59.2 | 7.44% |
| Potential clock throttle rate: 20% - 37.74% | | | | |

*FIG. 4A*

33 MHz EXTERNAL BUS

| BUS CYCLE | % | Avg. CPU clks for 33 MHz PCI system | Weighted Mix | Clock Throttle power savings leverage |
|---|---|---|---|---|
| Mem. Write | 70.4 | 6 | 422.4 | NA |
| Prefetch | 14.6 | 5 | 73.0 | NA |
| Data Read | 9.6 | 5 | 48.0 | 7.81%/1.95% |
| I/O Read | 2.5 | 12 | 30 | 4.88% |
| I/O Write | 2.1 | 12 | 25.2 | 4.10% |
| Other | 0.8 | 20 | 16 | 2.60% |
| Potential clock throttle rate: 8% - 19.39% | | | | |

*FIG. 4B*

POWER MANAGEMENT FOR LOW POWER PROCESSORS THROUGH THE USE OF AUTO CLOCK-THROTTLING

BACKGROUND OF THE INVENTION

1. Field of the Invention

The present invention relates to processors which consume the minimum amount of power. More particularly, the present invention relates to processors which shut down certain components of the processor during predetermined times of system operation.

2. Art Background

Computing devices today have become quite small in size. This has led to the popularity of portable computing devices, such as workstations, personal computers, including dedicated controllers and communication equipment. However, as the devices are portable, they require portable power devices to operate. Batteries, which are typically used, increase the weight of the portable device significantly. Therefore, it is desirable to minimize the size of the battery. This may be done a number of ways. One such way is to reduce the power consumption of the computing devices powered by the battery such that a smaller battery may be utilized.

SUMMARY OF THE INVENTION

The present invention provides a processor and processing system which minimizes power consumption by the processor. The processor detects the issuance of certain bus cycles or the execution of certain instructions which typically cause the processor to be idle for a period of time. Control circuitry detects the existence of the instruction and/or bus cycle and shuts down the clock driving certain processor components during the idle period. The control circuitry then detects the occurrence or upcoming occurrence of an event to which the processor responds and becomes active. At detection of this event, the clock signal input to these components is then restarted such that the processor can continue normal execution. Two clocks are provided to the processor. One clock remains on at all times. This clock drives the elements required to start and stop the second clock. The remainder of the components of the processor is controlled by the second clock which is turned on and off according to the instructions executed by the processor. It has been found that by shutting the clock down to all but the required components during the execution of certain bus cycles, significant power savings is realized.

BRIEF DESCRIPTION OF THE DRAWINGS

The objects, features and advantages of the present invention will become apparent to one skilled in the art from reading the following detailed description in which.

DETAILED DESCRIPTION OF THE INVENTION

In the following description for purposes of explanation numerous details are set forth in order to provide a thorough understanding of the present invention. However, it will be apparent to one skilled in the art that these specific details are not required in order to practice the present invention. In other instances well known electrical structures and circuits are shown in block diagram form in order not to obscure the present invention unnecessarily.

Figure 1:
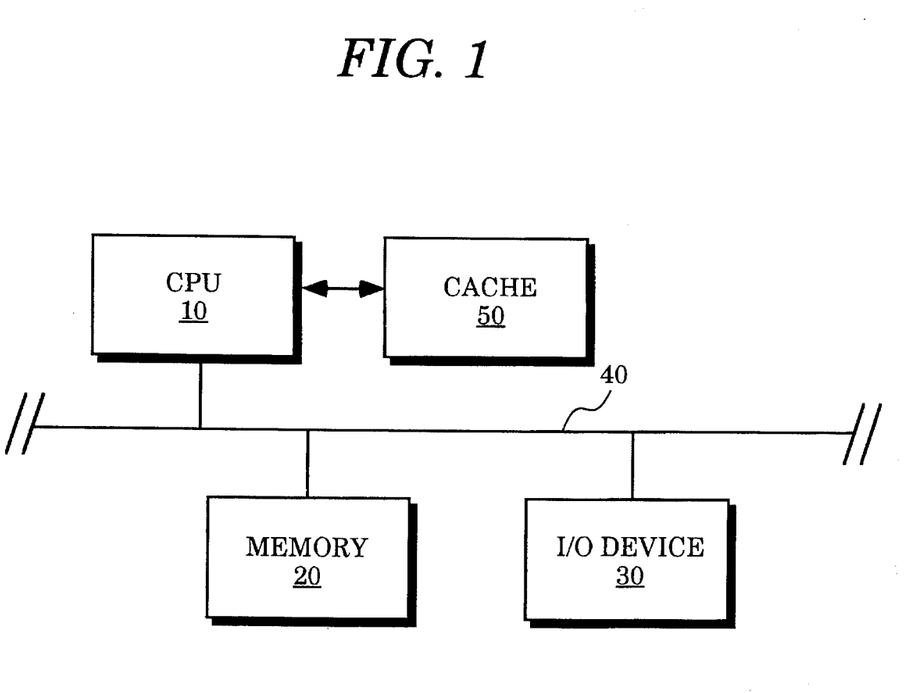
FIG. 1 is a block diagram illustration of a system which employs the power saving processor of the present invention.

Referring to FIG. 1, a typical processor system includes a central processing unit (CPU) 10, memory 20 and peripheral devices, such as I/O device 30, connected via a bus 40. The CPU may also have coupled to it a cache 50 for caching certain data to increase performance of the system. It has been realized that the execution of certain instructions, which subsequently are reflected as the issuance of certain bus cycles, occur which idle the CPU for a significant amount of time. Typically the CPU will continue to consume power while waiting for certain events to occur before processing is continued. For example, when a read to memory is performed, the CPU 10 will issue a bus cycle across the bus 40 to memory 20 to retrieve certain data. Once this bus cycle request is issued, the CPU 10 is idle until the reply including the data is sent back from the memory 20. Other cycles may be a I/O device read or write operation which similarly takes a significant amount of time during which the CPU 10 idles.

As power consumption has recently become an important issue to portable computing, it is critical that devices operate only when needed to minimize the amount of power consumed. Thus, a clock control circuit is introduced which monitors the operations of the CPU and shuts down the clock which drives components of the CPU during the portion of the execution of certain instructions during which the processor is idle.

Figure 2:
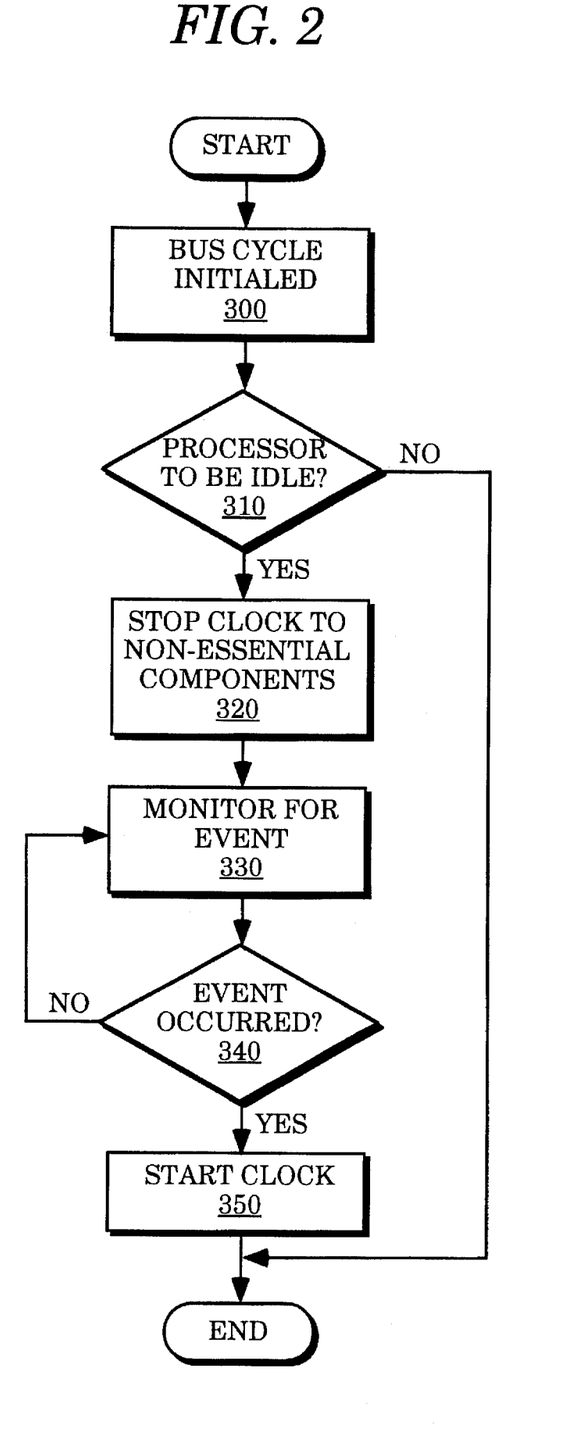
FIG. 2 is a flow chart illustrating the process of the present invention.

An illustrative flowchart of the process is shown in FIG. 2. At step 300, an instruction execution or a bus cycle occurs. If the processor is to be idle during execution of the bus cycle, step 310, the clock is stopped to non-essential components 320 when the idle state is entered. It is preferred that the non-essential components are defined as those components which are not required to shut-down or restart the clock. Once the clock is stopped, step 320, the controller then monitors for the event which indicates that the processor is to exit the idle state and is to be restarted by restarting the clock, steps 330, 340. Once this event is detected, the clock is restarted 350 and normal processing continues. Thus, a method for reducing power consumption and apparatus is provided which does not have impact on performance and requires little modification to the processor.

Figure 3A:
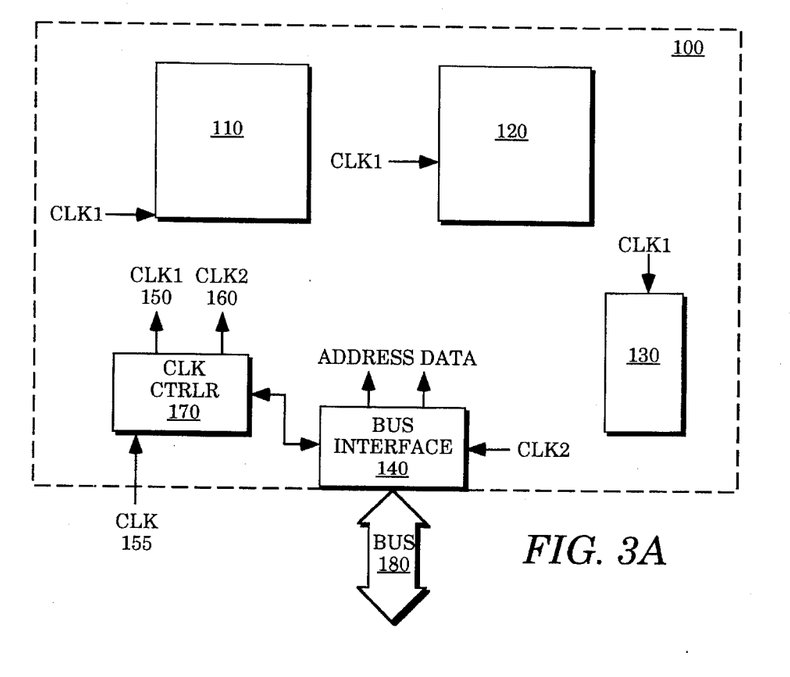
FIGS. 3a–3d illustrate embodiments of the present invention.

FIG. 3a is a simplified block diagram of a microprocessor component such as the i486® microprocessor, manufactured by Intel Corporation, Santa Clara, Calif. (i486 is a registered trademark of Intel Corporation). In order that the processor may be stopped during execution of instructions, the processor should be static in nature such that the processor maintains its internal state when not operating. This characteristic is found in many processors, including the i486. Depending upon the configuration, the processor 100 may include a variety of components 110, 120, 130, 140, each of which is driven by a clock signal for its operation. In the present invention one dock signal 155, is input to the processor. A dock controller 170 is provided to generate two clock output clock signals CLK1 150, CLK2 160 and to control enabling and disabling of at least one of the clock output signals 150, 160. The output of the clock controller 170 provides the clock signal inputs to the various elements 110, 120, 130, 140.

It has been determined that a significant amount of time is spent by the CPU waiting for the return of data or a response from devices coupled with the CPU via the bus. For example, if an I/O read operation is to be executed, the CPU issues a bus cycle onto the bus 180 with command and address information regarding the I/O read operation. The CPU 100 enters an idle state, waiting for a response to be returned across the bus 180. To save on power while the CPU is in an idle state, the clock controller 170 determines when such commands are executed and stops the clock to the elements of the CPU.

In the present embodiment one clock input signal is provided 155 and one or two clock signals 150, 160 are output. The first clock CLK1 150 is turned off by the clock controller during predetermined periods to minimize power consumption and CLK2 160 is kept in an on state to drive those components which cannot be turned off during the idle state of the microprocessor. Thus, the clock controller 170 detects those instructions during which the processor 100 is idle or waiting for a response and turns off the clock CLK1 150 until such time that the CPU will begin execution. More particularly, the dock controller includes logic to detect the execution of certain commands or bus cycles, logic to stop the clock driving the selected components of the CPU 100, logic to detect when the CPU is to exit the idle state and logic to restart the clock so that the CPU again executes in a normal manner.

Furthermore, this mechanism can be extended to achieve power savings during memory write operations. In this embodiment, the mechanism detects internal stalls which occur during external memory write signals, typically when resources are unavailable. Thus, for example, in the i486 processor, an embodiment incorporating the processor dock is throttled during a memory write operation when the write buffer is full, the external bus is busy with a bus cycle and the instruction executing issues a memory write bus cycle (thereby causing the processor to stall). The clock would stop and be restarted when one or all of the conditions change.

In one embodiment, the clock controller 170 is located on the processor component. The input clock 155 is input to the component. The clock controller 170 is preferably driven by the input clock or CLK2 160 which remains on at all times. Those elements of the CPU which are used to stop and start the CLK1 150 are also maintained on at all times and therefore are driven by CLK2 160. Although different configurations may have different clock requirements, typically the remainder of the elements of the CPU 100 can be turned off during idle by stopping the clock input signal to those elements. As up to 90% of the power consumption of the CPU is attributed to those elements which can be turned off during idle, a substantial power savings is realized.

Although the present invention may be implemented in a variety of embodiments, it is preferred that it be implemented in a manner transparent to the system. In one embodiment, the clock controller 170 monitors the bus cycles issued to determined when predetermined bus cycles occur. These predetermined bus cycles indicate that the processor component 100 will be idled for a period of time exceeding the amount of time required to stop and restart the clocks signal input to the components. Thus, for example, the clock controller will detect I/O read cycles (single as well as string operations), I/O write cycles, non-cacheable memory data read cycles, the first memory data read of a cache line fill and processor specific cycles, such as halt and other special cycles. Preferably, the clock should not be stopped for the first cycle of a split cycle as the split cycle logic is still performing some operations. In addition, it is preferable that prior to stopping the clock, it is confirmed that the floating point unit is busy performing operations and a cache invalidation bus cycle is not in progess. Other bus cycles, depending upon the processor and system configuration, may be determined to be one during which the clock signal input is temporarily stopped.

Figure 3B:
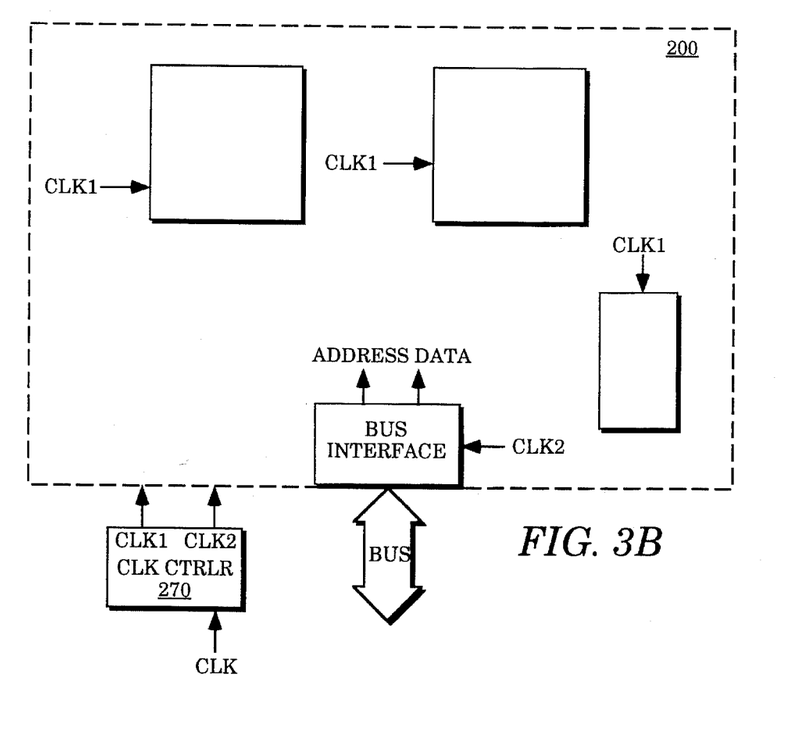

Alternatively, as shown in FIG. 3*b*, the clock controller 270 may be located external to the processor component 200 and still control the clock input to the component 200 in the same manner described above by monitoring the bus cycles issued by the processor.

Referring back to FIG. 3*a*, in an alternative embodiment, the clock controller detects the execution of predetermined instructions to determine when to stop the clock signal input. Preferably this is performed by the microcode of the processor which monitors the instructions executed. The microcode issues a signal to the clock controller 270 at a predetermined point during execution of one of the predetermined commands to stop the clock signal input while the CPU is in an idle state. For example, immediately after detection of execution of a halt command, the clock signal input is stopped.

Preferably, the clock controller restarts the clock signal input and therefore the components of CPU prior to the event after which the CPU exits the idle state and continues normal processing. For example, if the CPU is idle during a memory read operation, it is preferred that the dock is restarted just prior to the data being available to the CPU on the bus. In one embodiment, the clock controller detects the event and immediately restarts the bus. However, latency may occur if the clock is not restarted fast enough. For example, data incoming on the bus takes one clock cycle to latch the data prior to the data being available to the CPU. In order to maintain no latency, the clock controller should detect the incoming data and restart the clock within the dock cycle. However, power savings benefits are still realized even if latency is introduced. Thus, the power saving feature may be provided as a switchable option such that a user requiring the power saving feature would incur an additional wait state during the execution of the predetermined instructions. Furthermore, specific instructions and bus cycles can be segregated into groups according to potential latency/no latency, such that clock throttling for specified groups can be selectively enabled and disabled.

Figure 3C:
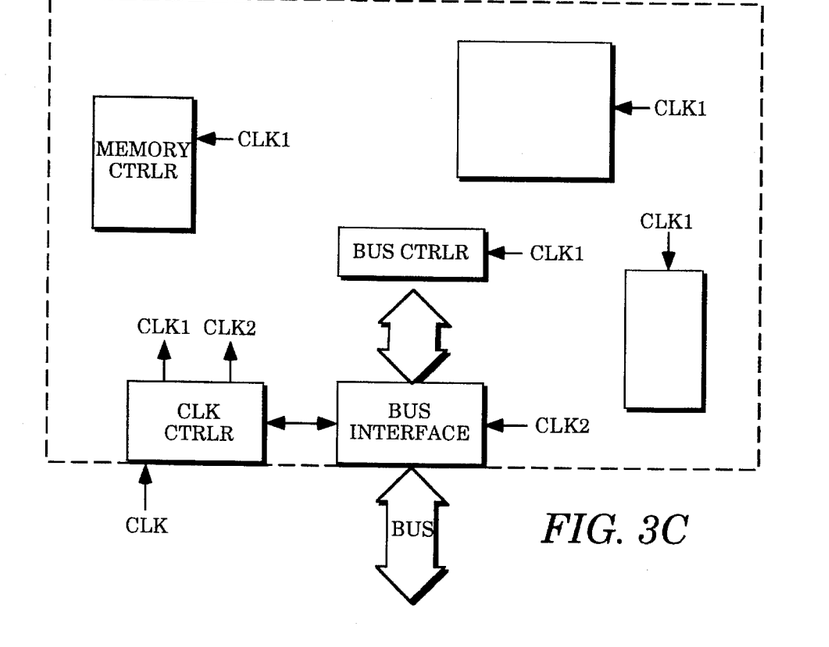

As shown in FIG. 3*c*, the system may also be implemented in an integrated CPU core. In this embodiment the bus operations and local memory on the component are monitored to determined when to stop and restart the clock. The controller monitors the bus as well as signals to the local memory to determine those cycles in which the processor will be idle for some period of time. In this embodiment an internal ready signal may be utilized to detect when to restart the clock. The internal ready signal is detected during an earlier clock cycle such that sufficient time is provided to restart the clock.

Figure 3D:
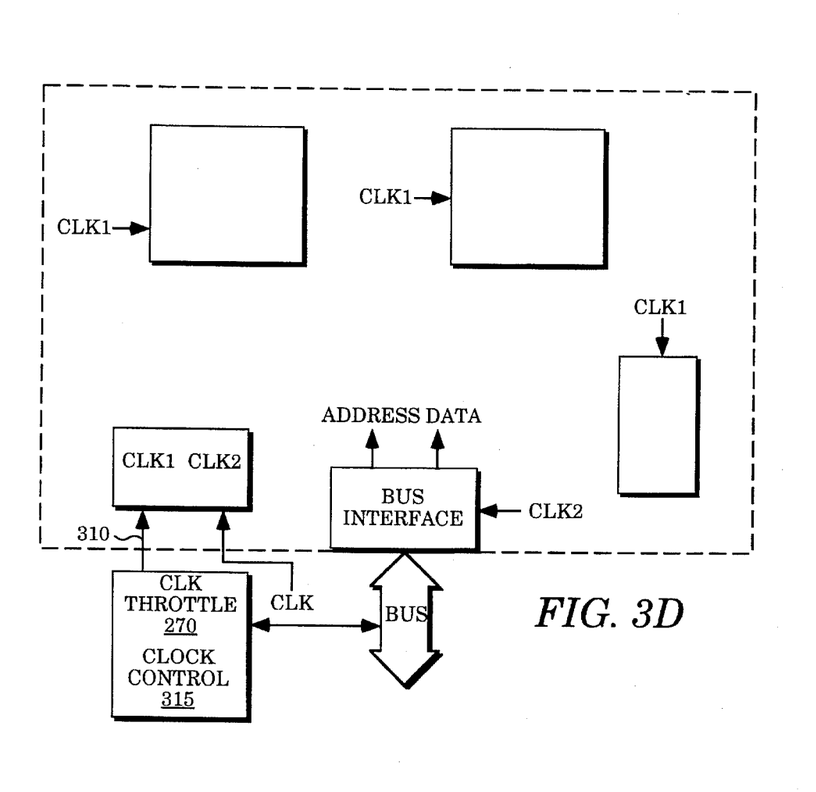

In another embodiment, as illustrated in FIG. 3*d*, an external pin, referred to herein as a "clock throttle pin" 310 is provided. This pin is accessible by user hardware. If the user pulls the pin, for example, active, the clock signals to most of the CPU core are stopped. The user would subsequently deassert a signal on this pin before continuing normal operation. Preferably an internal mechanism is provided to disable the clock throttle pin based on certain conditions, for example a split cycle, during which it is not preferred to perform clock throttling.

In this embodiment, the clock mechanism is visible and controllable external to the CPU. Therefore, external chip sets which operate with the CPU or other external logic 315 is needed to control the clock throttling. Furthermore, this embodiment monitors the bus external to the CPU to detect stall conditions during which clock throttling can be performed. Although this mechanism does not monitor for split cycles or other conditions during which it is not desirable to stop the clock, this embodiment can be used to throttle clocks for large portions of other bus cycles, with long wait states which are not typically throttled by an external mechanism, with little or no loss of performance. For example, if access is made to a slow memory or other internal device, by monitoring externally, clock throttling can be extended for additional cycles beyond the external CPU core cycles.

Figure 4A:
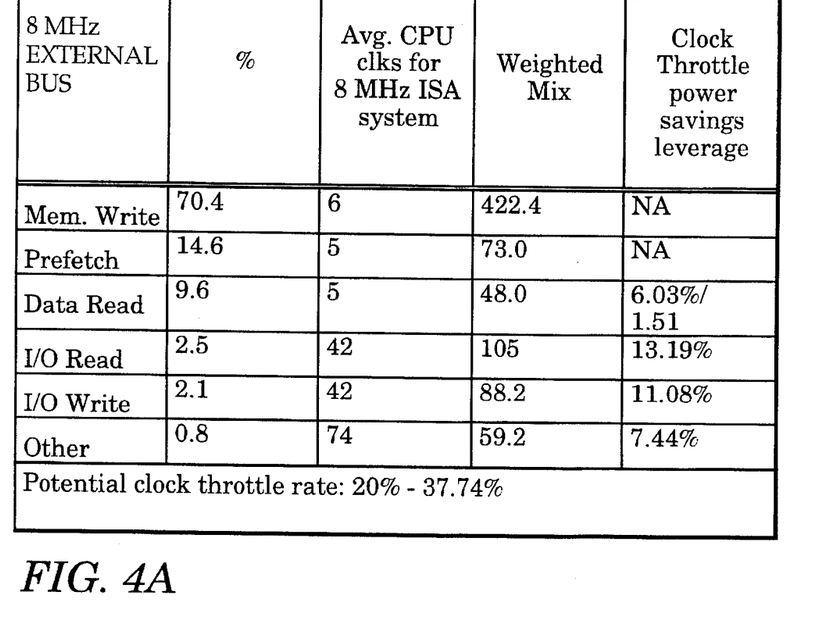
FIGS. 4a and 4b are tables illustrating potential power savings employing the system of the present invention.
Figure 4B:
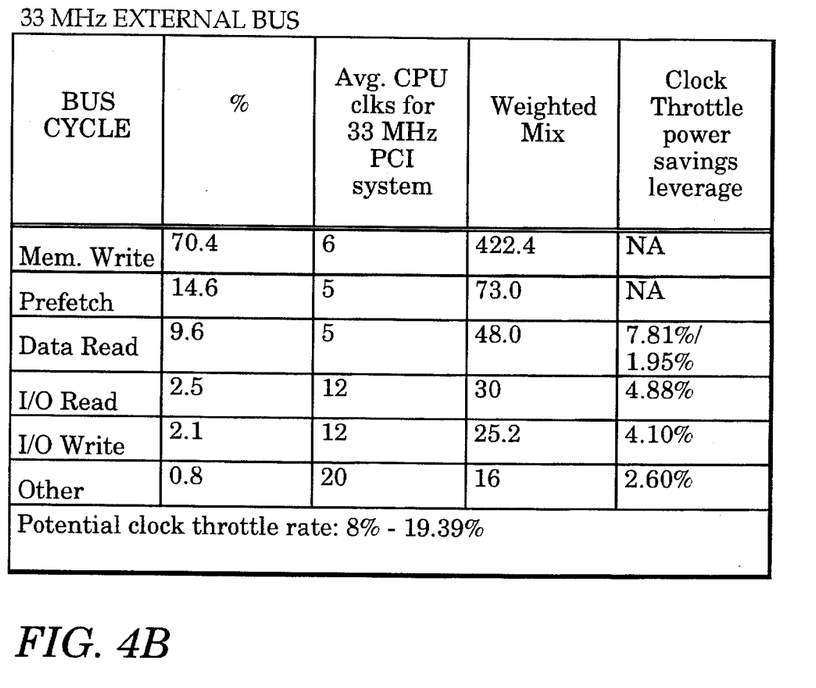

The power savings is directly proportional to the bus utilization and bus cycle mix. Thus, for example, a system with a 50% bus utilization may have the dock stopped for about 15–25% of the time given an exemplary system in which all I/O cycles on the external bus are assumed to be 5 clock cycles in duration and all other types of cycles, for example DMA, are assumed to be 9 external bus clock cycles in duration. Thus, power savings as shown in FIG. 4a and 4b can be realized. FIG. 4a illustrates power savings for an external bus running at ¼ of the frequency of the processor bus; FIG. 4b illustrates power savings realized for a system having an external bus operating at the same frequency as the processor bus. Therefore, if a system has a rate of clock throttle of approximately 20%, and assuming 50% power reduction due to clock throttle, an overall active power savings of 10–30% will be realized.

The invention has been described in conjunction with the preferred embodiment. It is evident that numerous alternatives, modifications, variations and uses will be apparent to those skilled in the art in light of the foregoing description. In particular, it is readily evident that the clock throttling mechanism described can be applied to a variety of components including CPUs and other processors. Furthermore, it is evident that the mechanism is extendible to a multiple processor environment or to a processor with multiple execution units. For example, the bus cycles related to the individual processors to detect stalls are monitored to control the clock inputs to the individual processors.

What is claimed is:

1. A method for minimizing power consumption of a processing component, comprising the steps of:

detecting the execution of a predetermined instruction that during the execution of the instruction the processing component is in a wait state for a length of time at least as long as the time it takes to stop and restart the clocks;

stopping the clock signal input to elements of the processing component when the processing component is to enter a wait state during execution of the predetermined instruction, such that certain elements of the processing component do not operate and consume power;

detecting the occurrence of a predetermined event indicative that the processing component is to exit the wait state; and restarting the clock signal input to the elements of the processing component when the occurrence of the predetermined event is detected thereby reinitiating operation of the certain elements of the processing component such that the processing component resumes normal operation.

2. The method as set forth in claim 1, wherein the step of detecting the execution of the predetermined instruction comprises the step of monitoring the bus for initiation of predetermined bus cycles determined to cause the processing component to be in a wait state.

3. The method as set forth in claim 1, wherein the step of detecting the execution of the predetermined instruction comprises the step of monitoring the types of instructions executed by the processing component to identify those instructions which cause the processing component to enter a wait state.

4. The method as set forth in claim 1, wherein the step of stopping the clock signal input stops the clock signal input to the elements of the processing component which do not detect the occurrence of a predetermined event and restart the clock signal input.

5. The method as set forth in claim 1, wherein the step of detecting the occurrence of a predetermined event comprises the step of detecting the issuance of a ready signal indicative that data is to be available to the processing component.

6. The method as set forth in claim 1, wherein the step of detecting the occurrence of a predetermined event detects that data is available to the processing component.

7. The method as set forth in claim 1, wherein the step of detecting the execution of the predetermined instruction comprises the step of detecting the initiation of I/O read/write bus cycles.

8. The method as set forth in claim 1, wherein the step of detecting the execution of the predetermined instruction comprises the step of detecting the initiation of non-cacheable memory data read cycles.

9. The method as set forth in claim 1, wherein the step of detecting the execution of the predetermined instruction comprises the step of detecting the initiation of the first memory data read of a cache line fill.

10. The method as set forth in claim 1, wherein the step of detecting the execution of the predetermined instruction comprises the step of detecting the initiation of processing component specific bus cycles.

11. The method as set forth in claim 1, wherein the step of detecting the execution of the predetermined instruction comprises the step of detecting processing component stalls during external memory write cycles.

12. The method as set forth in claim 11, wherein the step of detecting comprises the steps of:

determining that a write buffer is full, detecting that the external bus is busy with a bus cycle, and the instruction executing issues a memory write cycle.

13. The method as set forth in claim 1, further comprising the step of confirming that a coprocessor is not busy and a cache invalidation bus cycle is not in progress prior to stopping the clock signal input, such that if the coprocessor is busy or a cache invalidation cycle is in progress, the clock signal input is not stopped.

14. A processing component comprising:

means for executing instructions, said means receiving a clock signal input to drive the means for executing instructions;

means for detecting the execution of a predetermined instruction, said means for executing waiting during at least a portion of the time required to execute the predetermined instruction;

means for stopping the clock signal input to drive the means for executing instructions when the means for executing instructions is to wait during execution of the predetermined instruction;

means for detecting the occurrence of a predetermined event indicative that the processing component is to cease waiting; and means for restarting the clock signal input to the processing component when the occurrence of the predetermined event is detected thereby reinitiating the operation of the means for executing instructions such that the processing component resumes normal operation.

15. The processing component as set forth in claim 14, wherein execution of the predetermined instruction causes bus cycles to be initiated by the processing component, said means for detecting the execution of the predetermined instruction comprises bus monitoring means which detects the initiation of predetermined bus cycles which are determined to cause the processing component to be in a wait state.

16. The processing component as set forth in claim 14, wherein the means for detecting the execution of the predetermined instruction comprises microcode which monitors the types of instructions executed by the processing component to identify those instructions which cause the processing component to enter a wait state and determines when the means for executing enters a wait state.

17. The processing component as set forth in claim 14, wherein the means for detecting the occurrence of a predetermined event comprises means for detecting the receipt of a ready signal indicative that data is to be available to the processing component.

18. The processing component as set forth in claim 14, wherein the means for detecting the occurrence of a predetermined event detects that data is available to be received by the processing component.

19. The processing component as set forth in claim 14, further comprising a write buffer for writing data to be written to external memory and an external bus connecting the processing component and external memory, said means for detecting the execution of the predetermined instruction comprising, means for detecting processing component stalls during external memory write cycles.

20. The processing component as set forth in claim 19, wherein the means for detecting processing component stalls comprises:

means for determining that a write buffer is full, means for detecting that the external bus is busy with a bus cycle; and means for detecting the issuance of a memory write cycle.

21. The processing component as set forth in claim 14, further comprising a means for confirming that a coprocessor is not busy and a cache invalidation bus cycle is not in progress prior to stopping the clock signal input, such that if the coprocessor is busy or a cache invalidation cycle is in progress, the clock signal input is not stopped.

22. A processor comprising:

a central processing unit for executing instructions, said CPU receiving a CPU clock signal input to drive the CPU;

a clock controller coupled to receive at least one clock signal and output the CPU clock signal, said controller comprising;

a first detector for detecting the execution of a predetermined instruction, said CPU waiting during at least a portion of the time required to execute the predetermined instruction, logic responsive to the first detector for stopping the CPU clock signal input when the CPU is to wait during execution of the predetermined instruction, a second detector which detects the occurrence of a predetermined event indicative that the CPU is to cease waiting, and logic responsive to the second detector for restarting the clock signal input to the processor when the occurrence of the predetermined event is detected thereby reinitiating the operation of the CPU such that the processor resumes normal operation.

23. The processor as set forth in claim 22, said clock controller generating a second CPU clock signal, said second CPU clock signal being maintained in an on state.

24. The processor as set forth in claim 22, wherein the first detector comprises microcode which monitors the types of instructions executed by the CPU to identify those instructions which cause the CPU to enter a wait state and determines when the CPU enters a wait state.

25. The processor as set forth in claim 22, wherein the first detector comprises logic coupled to monitor bus cycles initiated by the CPU which are determined to cause the CPU to be in a wait state.

26. The processor as set forth in claim 22, wherein the second detector is coupled to receive a ready signal indicative that data is to be available to the processor.

27. The processor as set forth in claim 22, wherein the second detector detects that data is available to be received by the processor.

28. The processor as set forth in claim 22, further comprising a write buffer for writing data to be written to external memory and an external bus connecting the processor and external memory, said first detector detecting processor stalls during external memory write cycles.

29. The processor as set forth in claim 28, said first detector:

determining that a write buffer is full;

detecting that the external bus is busy with a bus cycle; and detecting the issuance of a memory write cycle.

30. The processor as set forth in claim 22, further comprising logic for confirming that a coprocessor is not busy and a cache invalidation bus cycle is not in progress prior to stopping the clock signal input, such that if the coprocessor is busy or a cache invalidation cycle is in progress, the clock signal input is not stopped.

31. A microprocessor system comprising:

a bus;

a central processing unit (CPU) coupled to the bus, said CPU receiving a CPU clock signal input to drive the CPU, said CPU initiating bus cycles on the bus to communicate information with a device, said CPU entering a wait state during the execution of a predetermined instruction comprising communications with the device across the bus;

at least one device coupled to the bus, said device receiving signals indicative of the bus cycle initiated by the CPU and subsequently issuing signals on the bus to the CPU indicative of a response to bus cycle signals received and;

a clock controller which controls the CPU clock signal input, said clock controller coupled to the bus detecting the execution of the predetermined instruction and stopping the CPU clock signal when the CPU enters a wait state, said CPU monitoring the bus for issuance of bus cycle signals by the device, said clock controller restarting the CPU clock signal when the device issued bus cycle signals are detected such that the CPU begins normal operation;

wherein power consumption by the CPU is minimized by stopping the clock when the CPU would be operating in a wait state.

32. The system as set forth in claim 31, said clock controller further coupled to receive a second clock signal input which drives the clock controller, said second clock signal input being maintained in an on state.

33. The system as set forth in claim 31 wherein said clock controller is located on the CPU component.

34. The system as set forth in claim 31, wherein said clock controller is located external to the CPU.

35. The system as set forth in claim 31, wherein said clock controller comprises microcode which monitors the types of instructions executed by the CPU to identify those instructions which cause the CPU to enter a wait state and determines when the CPU enters a wait state.

36. The system as set forth in claim 31, wherein the clock controller comprises logic coupled to monitor bus cycles initiated by the CPU which are determined to cause the CPU to be placed in a wait state.

37. The system as set forth in claim 31, wherein the bus signal issued by the device comprises a ready signal indicative that data is to be placed on the bus to be available to the processor.

38. The system as set forth in claim 31, wherein the bus signal also issued by the device comprises data placed on the bus to be available to be received by the processor.

39. The system as set forth in claim 31, wherein the predetermined instruction comprises I/O read/write bus cycles.

40. The system as set forth in claim 31, wherein the predetermined instruction comprises non-cacheable memory data read cycles.

41. The system as set forth in claim 31, wherein the predetermined instruction comprises a first memory data read cycle of a cache line fill.

42. The system as set forth in claim 31, further comprising external memory coupled to the bus and a write buffer for writing data to be written to external memory, said clock controller detecting processor stalls during external memory write cycles.

43. The system as set forth in claim 42, wherein said clock controller;

determining that a write buffer is full;

detecting that the external bus is busy with a bus cycle; and detecting the issuance of a memory write cycle.

44. The system as set forth in claim 31, wherein said clock controller stops the CPU clock signal when the CPU enters a wait state and a coprocessor is confirmed not to be busy performing operations and a cache invalidation bus cycle is not in progress.

* * * * *

UNITED STATES PATENT AND TRADEMARK OFFICE
CERTIFICATE OF CORRECTION

PATENT NO. : 5,586,332
DATED : December 17, 1996
INVENTOR(S) : Jain et al.

It is certified that error appears in the above-indentified patent and that said Letters Patent is hereby corrected as shown below:

In column 2 at line 64 delete "dock" and insert --clock--

In column 2 at line 65 delete "dock" and insert --clock--

In column 3 at line 25 delete "dock" and insert --clock--

In column 3 at line 36 delete "dock" and insert --clock--

In column 4 at line 32 delete "dock" and insert --clock--

In column 4 at line 41 delete "dock" and insert --clock--

In column 5 at line 23 delete "dock" and insert --clock--

In column 8 at line 35 delete "detector" and insert --factor--

Signed and Sealed this

Twentieth Day of May, 1997

Attest:

BRUCE LEHMAN

Attesting Officer       Commissioner of Patents and Trademarks